3,400,952
EXPANSION JOINT ASSEMBLY
Robert L. Swenson, Upper Montclair, and John L. Clark, Haworth, N.J., assignors to General Rubber Corporation, Tenafly, N.J., a corporation of New Jersey
Filed Sept. 14, 1966, Ser. No. 579,296
1 Claim. (Cl. 285—47)

ABSTRACT OF THE DISCLOSURE

An assembly for connecting rigid extensions of flanged ends of pipe sections to a flexible intermediate expansion joint including elastomeric bearing members positioned in apertures in said flange extensions and formed to permit easy sliding motion therein of a tie rod having means at its ends abutting the bearing members, thereby avoiding metal to metal contact between the flanges and eliminating objectionable vibration and sound transmission between the so connected pipe sections, and a sleeve positioned on the tie rod and of less length than the distance between the gusset plates, preventing excess movement of the flanges toward each other.

---

Figure 1:
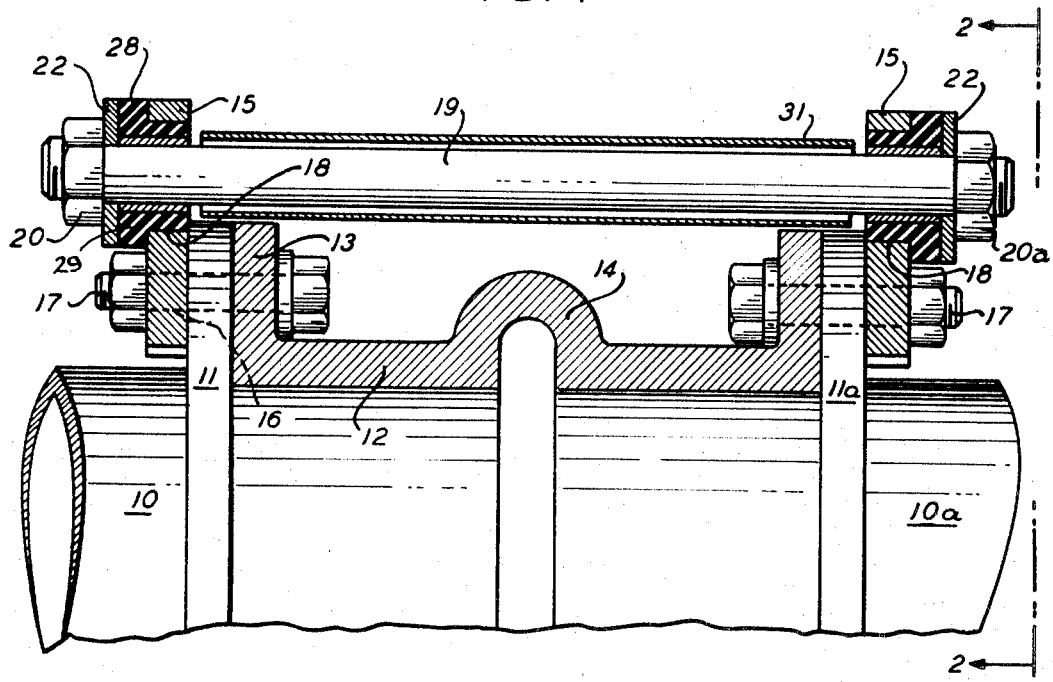

This invention relates to expansion joints used to connect pipe sections together for continuous flow of materials notwithstanding contraction and expansion of the connected pipe sections. An expansion joint should ideally expand freely within controlled limits, without damage, and should likewise contract, as conditions of use require. In some cases, expansion joint packages have been made, ready for installation, with flat rubber washers to be positioned between the gusset plates and the tie rod bolts. These washers, when so installed, ofter extruded in use, due to the pressures encountered; they were generally not engineered properly to take the work loads encountered, and did not enable smooth movement of the expansion joint tie rods. As a result, in use, direct metal to metal contact was made with objectionable sound and vibration transmission between the pipe sections in use.

The present invention answers the need for a structure which will overcome the above noted deficiencies and will enable the expansion joint to be precision made to withstand pre-calculated loads in use and to have the required flexibility while firmly controlling expansion and contraction within previously calculated limits.

The expansion joint structure embodying this invention incorporates a novel flexible bushing construction which enables the stretcher bolt to slide freely and easily within the assembly, to control movements of the expansion joint in use, and to absorb previously calculated maximum work loads. The flexible member stays in place in use and does not deteriorate, and, with the remainder of the expansion joint parts, may be manufactured to take stresses and strains encountered in use, and to provide durable, long lasting, effective vibration and sound insulation of the connected pipe sections.

The structure of this application enables the flanged ends of metal pipes to be connected to a flexible intermediate member by bolts passing through apertures in gusset plates fixed to the pipe flanges or defining extensions thereof, for the continuous flow through the metal pipes and intermediate flexible member of material notwithstanding the expansion and contraction of the pipes, and elastomeric means for connection of the flanges such as to control movement thereof while preventing direct metal-to-metal contact therebetween.

Pursuant to the invention, further means are provided for restricting the extent of movement of the pipe sections toward each other; this is achieved by a sleeve mounted on a tie rod which tie rod passes through elastomeric members in the apertures of the extended portions of the pipe flanges; the sleeve is proportioned to be of less length than the distance between the inner ends of the elastomeric members to prevent excess compression of the assembly.

The drawings, illustrating procedures and devices useful in carrying out the invention, and the description below, are exemplary only of the invention, which shall be deemed to cover all other devices and procedures coming within the scope and purview of the appended claims.

Figure 2:
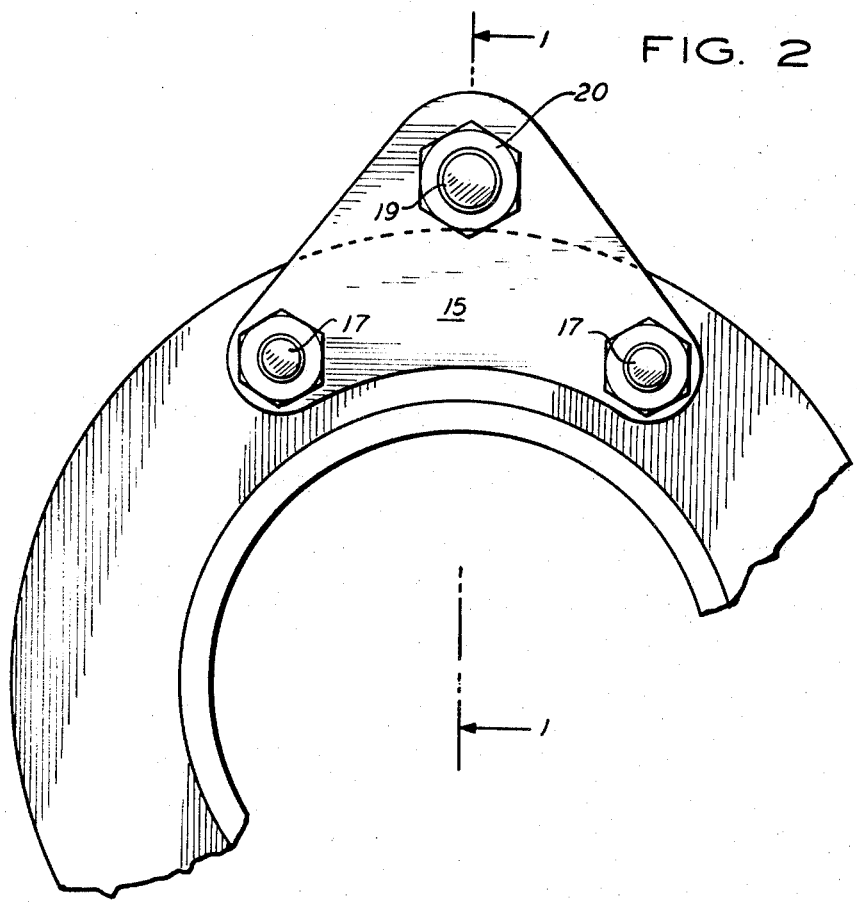
Figure 3:
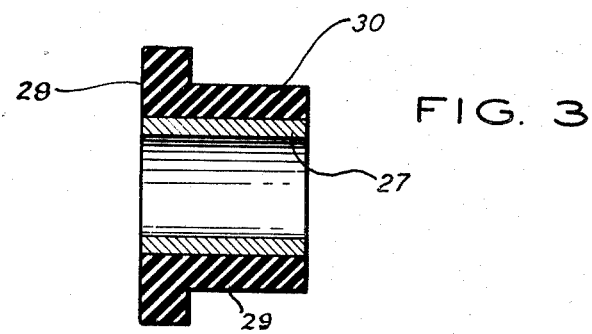

In the drawings, wherein similar reference characters indicate like parts:

FIG. 1 is a fragmentary, longitudinal sectional view, taken at line 1—1 of FIG. 2, of a device embodying the invention, FIG. 2 is a partly sectional, end elevational view taken at line 2—2 of FIG. 1, and FIG. 3 is a vertical sectional view thereof, As shown in the drawings (FIG. 1) the device of this invention is adapted, for example, to the assembly of a pair of pipes or conduits 10, 10a, having rigid end flanges 11, positioned against the ends of a yieldable member such as a flexible expansion joint 12, which may have end flanges 13 for facility of securing the pipes thereto, and which may be provided with one or more expansion convolutions or plaits 14, for expansion and contraction. Gusset plates 15 (FIGS. 2 and 1) are provided with apertures 16 (FIG. 1) preferably at least three in number, two of said apertures receiving bolts 17 (FIG. 2), passed through gusset plate apertures 16 and through corresponding apertures (FIG. 1) in the rigid flanges 11 of pipes 10 and the end flanges 13 of expansion joint 12, to secure said parts together as shown in FIG. 1, a third aperture 18 receiving tie rod 19, preferably made of metal, alloy or other rigid material so as to secure flanges 11 and their associated parts at each end of the assembly together and limit the extent of expansion of expansion joint 12. Tie rod 19 may be engaged by a nut or head 20 at one end and a threaded nut 20a engaging the other end (FIG. 1).

Flexible T-shaped (FIG. 3) bearing members 28 (preferably rubber) are positioned (FIG. 1) in the apertures 18 of the gusset plates and against the gusset plates 15; they comprise flat apertured disc portions 29 (FIG. 1) adapted to be positioned against the gusset plates and open collar portions 30 having sleeves 27 of brass or other material inserted or bonded therein, said bearing members 28 adapted to be passed through the gusset plate apertures 18 and to preferably snugly receive the tie rod therethrough, the tie rod freely sliding in sleeve 27 controlling the movements of the expansion joint.

It will thus be noted that, pursuant to the invention, direct and constant assembly of the parts is achieved while preventing the transmission of vibration and sound from pipe 10 to pipe 10a, providing vibration and sound insulation between the flange 11 and gusset plate 15 at one end of the expansion joint and the corresponding parts at the other end thereof.

A contraction limit sleeve 31 may be positioned on the tie rod, of less length than the distance between the assembled gusset plates (FIG. 1) to limit the extent of movement toward each other of the flanges 11, 11a and thus limiting contraction of the flexible expansion joint, preventing crushing of the expansion joint and undue stress and strain. Thus the expansion joint is safeguarded from undue expansion as well as undue contraction, while providing vibration and sound insulating features above noted. The rubber bearing member 28 makes a complete rubber to rubber isolating unit of the expansion joint. The face of the flat apertured disc portion 29 of member 28, where it contacts the steel washer 22, is designed to withstand the maximum load that can be transmitted to it when the expansion joint is under maximum recommended pressure. This load is that accepted by the industry as the maximum load for rubber in continuous service under compression.

In devices intended for such uses heretofore, flat rubber washers were used, which wore out rapidly, failed to prevent passage of sound and vibration from one end of the expansion joint to the other and thus from pipe to pipe, down time for repairs interrupted continuity of use of the connected system and increased cost of operation. Pursuant to our invention the flat disc portion 29 and open collar portion 30 of flexible member 28 and the sleeve 28 thereof are designed to withstand loads which may be calculated in advance and indicated in the sales literature, so that customers may safely use the same; likewise, the thickness of the gusset plates and the number of individual rods 19 used in connection with the flexible member 28 may be pre-calculated and indicated according to the size of the pipes to be connected and the work loads.

While the foregoing disclosure of exemplary embodiments is made in accordance with the Patent Statutes, it is to be understood that the invention is not limited thereto or thereby, the inventive scope being defined in the appended claims.

We claim:

1. In a pipe joint including rigid flanged pipe members secured to the ends of an interposed tubular connecting flexible member, an assembly for connecting said flanged members to each other for limited movement without direct rigid connection therebetween, said assembly including portions rigidly attached to and extending radially beyond said flanges, each of said portions having at least one aperture therein, elastomeric bearing members positioned in said apertures, said bearing members having radially extending shoulder means having inner and outer radial surfaces, said inner radial surfaces of said shoulder means being in axial abutment with the axially outer surfaces of said extended portions, an elongated tie rod member positioned within and proportioned to slidably extend through and engage the elastomeric members, securement means on the ends of said tie rod member, said securement means being positioned so as to engage said outer radial surfaces of said shoulder means upon a predetermined axial expansion of said flexible member to limit the extent of such expansion, and an axially movable sleeve member positioned on said tie rod member and of less length than the distance between the axially inner surfaces of said extended portions to limit the extent of contraction of said flexible member between said flanged pipe members and prevent undue stress and strain thereon.

References Cited

UNITED STATES PATENTS

| 922,556 | 5/1909 | Batchelder | 285—114 X |
|---|---|---|---|
| 1,592,175 | 7/1926 | Boyd | 285—48 |
| 1,718,209 | 6/1929 | Aldrich et al. | 285—226 X |
| 2,355,440 | 8/1944 | Howard | 285—114 X |
| 2,787,486 | 4/1957 | Thiry. | |
| 3,010,736 | 11/1961 | Dilley | 285—114 |
| 3,144,261 | 8/1964 | Stephens | 285—114 |

FOREIGN PATENTS 262,058  9/1949  Switzerland.

OTHER REFERENCES

Flexodisc & Flexoleed, Croll-Reynolds Brochure, Croll-Reynolds Engineering Co., Inc., copyright June 1962.

CARL W. TOMLIN, *Primary Examiner.*

RICHARD G. BERKLEY, *Assistant Examiner.*